(12) United States Patent
Arikawa et al.

(10) Patent No.: US 9,751,266 B2
(45) Date of Patent: Sep. 5, 2017

(54) REPAIR METHOD OF REPAIR TARGET PORTION, AND REPAIR APPARATUS

(71) Applicant: MITSUBISHI AIRCRAFT CORPORATION, Aichi (JP)

(72) Inventors: Kiwamu Arikawa, Tokyo (JP);
Masayoshi Suhara, Tokyo (JP);
Hiroyuki Iseki, Hyogo (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 352 days.

(21) Appl. No.: 14/227,362

(22) Filed: Mar. 27, 2014

(65) Prior Publication Data

US 2014/0290832 A1    Oct. 2, 2014

(30) Foreign Application Priority Data

Mar. 28, 2013   (JP) .................................. 2013-69372

(51) Int. Cl.
*B29C 73/10* (2006.01)
*B29C 73/12* (2006.01)
*B29C 73/30* (2006.01)
*B29C 73/34* (2006.01)
*B29C 35/08* (2006.01)

(52) U.S. Cl.
CPC .............. *B29C 73/10* (2013.01); *B29C 73/12* (2013.01); *B29C 73/30* (2013.01); *B29C 73/34* (2013.01); *B29C 2035/0855* (2013.01)

(58) Field of Classification Search
CPC .......... B29C 73/10; B29C 73/12; B29C 73/30; B29C 73/34
See application file for complete search history.

(56) References Cited

U.S. PATENT DOCUMENTS

| 6,355,203 B1 * | 3/2002 | Charmes .................. B29C 70/44 156/275.5 |
| 6,665,949 B1 * | 12/2003 | Reis ...................... F26B 21/006 34/104 |
| 2004/0099660 A1 * | 5/2004 | Matsen .................. B23K 13/01 219/634 |

(Continued)

FOREIGN PATENT DOCUMENTS

| JP | 61103974 A * | 5/1986 | ................ C09J 7/02 |
| JP | 01034723 A * | 2/1989 | ............. B29C 65/04 |

(Continued)

OTHER PUBLICATIONS

Office action issued for JP2013-069372 dated Jan. 4, 2017.

*Primary Examiner* — Jeff Aftergut
*Assistant Examiner* — Jaeyun Lee
(74) *Attorney, Agent, or Firm* — Pearne & Gordon LLP

(57) ABSTRACT

The present invention sufficiently heats a repairing material while preventing change in quality of a base material provided with the repairing material so as to securely bond the repairing material to a repair target portion. The repair method of the present invention, in order to repair a repair target portion 14 existing in an outer panel 1, includes a repairing material disposing step of disposing a repairing patch 20 and an adhesive 21A to the repair target portion 14; and a heating-hardening step of heating and hardening the adhesive 21A by irradiating it with electromagnetic waves.

17 Claims, 3 Drawing Sheets

(56) References Cited

U.S. PATENT DOCUMENTS

| | | | | |
|---|---|---|---|---|
| 2007/0277655 | A1* | 12/2007 | Kawai | B28B 11/12 83/13 |
| 2009/0053406 | A1* | 2/2009 | Ackerman | B29C 73/10 427/142 |
| 2009/0235552 | A1* | 9/2009 | Takagi | B28B 11/241 34/437 |

FOREIGN PATENT DOCUMENTS

| | | | | |
|---|---|---|---|---|
| JP | H04-316845 | A | | 9/1992 |
| JP | 2003525138 | A | | 8/2003 |
| JP | 2005-271247 | A | | 10/2005 |
| JP | 2009-208301 | A | | 9/2009 |
| JP | 2009208351 | A | | 9/2009 |
| JP | 2010536622 | A | | 12/2010 |
| KR | 100697032 | B1 | * 3/2007 | E01C 23/00 |
| WO | 01/64387 | A1 | | 9/2001 |
| WO | 2009026442 | A1 | | 2/2009 |

* cited by examiner

REPAIR METHOD OF REPAIR TARGET PORTION, AND REPAIR APPARATUS

BACKGROUND OF THE INVENTION

Field of the Invention

The present invention relates to a method of repairing a repair target portion existing in a repair target, and a repair apparatus.

Description of the Related Art

An outer panel (skin) forming an outer surface of a fuselage and a wing of an aircraft requires repairing if the outer panel is damaged by a lightning strike or flying objects such as hailstones. As a repairing material for use in such repairing, a composite material, such as fiber reinforced plastic (FRP), is used.

In order to heat and harden the repairing material so as to bond this repairing material to the repair target portion, a heater mat is used, as shown in Japanese Patent Laid-Open No. 2009-208301. The heater mat is placed on the repairing material disposed to the repair target portion. A heat gun or an oven may also be used for heating the repairing material.

An external heat source, such as a heater mat, is used for heating the repairing material to transfer heat from the heat source to the repairing material. At this time, heat is diffused from the heat source and the repairing material to the surroundings of the repairing material. Consequently, a base material (outer panel) where the repairing material is disposed may be changed in quality due to overheating.

If output of the external heat source is decreased in order to avoid change in quality of the base material, insufficient heating is applied to the repairing material, which results in poor hardening, and hinders secure bonding of the repairing material to the repair target portion.

An object of the present invention, which has been made in order to solve the problems according to the conventional art, is to sufficiently heat a repairing material while preventing change in quality of a base material provided with the repairing material so as to securely bond the repairing material to the repair target portion.

SUMMARY OF THE INVENTION

A repair method of the present invention is a method of repairing a repair target portion existing in a repair target, and the method includes: a repairing material disposing step of disposing a repairing material to the repair target portion; and a heating-hardening step of heating and hardening the repairing material by irradiating the repairing material with electromagnetic waves.

According to the present invention, the irradiation with the electromagnetic waves causes the repairing material to generate heat without using an external heat source, thereby applying heat to the repairing material. The heat source in the present invention is the repairing material, and this is the heating target itself. Hence, different from the case of using the external heat source, it is not required to generate thermal energy with greater quantity of heat than quantity of heat reaching the heating target, estimating diffusion of the thermal energy during transmission of the heat.

In the present invention, sufficient quantity of heat for hardening is used so as to cause the repairing material to generate heat, thereby sufficiently heating the repairing material as well as minimizing thermal diffusion to the surroundings of the repairing material.

According to the present invention, it is possible to securely bond the repairing material to the base material without changing quality of the base material provided with the repairing material by overheating.

The repairing material used in the present invention includes various forms.

The repair method using a composite material in the repairing material includes: a method of laminating fibers, which is formed in a sheet form and impregnated with liquid thermosetting resin, to the repair target portion, and hardening the resin by heating (wet lay-up); and a method of laminating a half-cured intermediate material (prepreg) to the repair target portion, and hardening this material by heating. The above repair method may also include such a method that uses a repairing patch heated and hardened in advance (precured patch), and bonds this repairing patch to the repair target portion with a thermosetting adhesive.

Hence, the repairing material is equivalent to a precured patch formed of a thermosetting resin hardened in advance, and a thermosetting adhesive that bonds the precured patch to the repair target portion, for example.

As another form of the repairing material, the repairing material is equivalent to prepreg formed of a half-hardened thermosetting resin, and a thermosetting adhesive that bonds the prepreg to the repair target portion.

As yet another form of the repairing material, the repairing material is equivalent to a liquid thermosetting resin and fibers in the case of performing the wet lay-up.

It is defined that the repair target portion provided with the above described various repairing materials includes a damaged portion generated in the repair target by impact, high temperature, abrasion, and corrosion, etc., and a predetermined range surrounding this damaged portion.

In the repair method of the present invention, in the heating-hardening step, the repairing material and an oscillator that oscillates the electromagnetic waves are preferably covered by a first shield member that blocks the electromagnetic waves.

In the repair method of the present invention, in the repairing material disposing step, a second shield member for blocking the electromagnetic waves is preferably disposed between the repairing material and the repair target.

It is possible to efficiently irradiate the repairing material with irradiation energy of the electromagnetic waves by using the first shield member or the second shield member.

The repairing material and the oscillator are covered by the first shield member, and the second shield member is disposed between the repairing material and the repair target, thereby restricting the irradiation region of the electromagnetic waves within space surrounded by the first shield member and the second shield member; thus it is possible to locally heat only the repairing material in an efficient manner without dispersing the energy of the electromagnetic waves to the outside of the first shield member and the second shield member.

The second shield member is left in the repair target even after the repairing. If the repair target is an outer panel of an aircraft, the second shield member contributes to securing the thunder resistance of the aircraft. In general, a lightning protection material having preferable conductivity is provided to the outer surface of the outer panel. It is possible to diffuse a lightning strike current along the lightning protection material and the second shield member to the outer panel.

The repair method of the present invention is suitable for repairing a honeycomb core sandwich structural body configured by holding a core having a honeycomb structure that includes a number of cells between outer skins.

Moisture is accumulated inside the core of the honeycomb core sandwich structural body. If the repairing material is heated, the inner pressure of the cells is increased due to vaporized moisture inside the core because of increase in temperature of the core, and thus the honeycomb core sandwich structural body may be destroyed.

According to the present invention, however, it is possible to minimize thermal diffusion to the surroundings of the repairing material, as described above, thereby suppressing vaporization of the moisture inside the core. Accordingly, it is possible to eliminate a process for drying the inside of the core that has been required in the conventional art, resulting in reduction of time required for repairing the honeycomb core sandwich structural body.

Another repair method of the present invention is a method of repairing a repair target portion existing in a honeycomb core sandwich panel configured by holding a core having a honeycomb structure including a number of cells between outer skins, and the method includes: disposing an oscillator of electromagnetic waves on a side of one of the outer skins of the honeycomb core sandwich panel; disposing a shield member for blocking the electromagnetic waves on a side of the other of the outer skins of the honeycomb core sandwich panel; performing a moisture releasing step of vaporizing moisture existing inside the core using the electromagnetic waves radiated from the oscillator, and releasing the moisture from the repair target portion to an outside of the core; and thereafter, performing a heating-hardening step of hardening a repairing material disposed to the repair target portion by heating.

When the electromagnetic waves are radiated in the moisture releasing step, the moisture accumulated inside the core is rapidly heated and vaporized, and then released to the outside of the core through the repair target portion.

Subsequently, the heating-hardening step of heating the repairing material to be hardened is performed, and the temperature of the core becomes increased by heating the repairing material, but the amount of the moisture inside the core is reduced, and thus it is possible to suppress increase of the inner pressure of the cells due to the water vapor.

According to the present invention, through the moisture releasing step using the electromagnetic waves, it is possible to rapidly heat the moisture inside the core, thereby facilitating vaporization of the moisture. Hence, it is possible to quickly reduce the amount of the moisture inside the core to such an extent that prevents destruction of the panel due to increase of the inner pressure of the cells at the time of heating. Accordingly, it is possible to prevent destruction of the honeycomb core sandwich panel without requiring a long time for reducing the amount of the moisture inside the core.

The repair method of the present invention is a method of repairing a repair target portion existing in a repairing target, and the method includes: a repairing material disposing step of disposing a repairing material to the repair target portion; and a step of heating and melting the repairing material by irradiating the repairing material with electromagnetic waves, and thereafter putting the repairing material into a solidified state.

In the present invention, the heat source is the repairing material, and this is also the heating target itself, and thus the repairing material is caused to generate heat with quantity of heat sufficient for melting itself, thereby sufficiently heating the repairing material as well as minimizing thermal diffusion to the surroundings of the repairing material.

Hence, according to the present invention, it is possible to securely bond the repairing material to the base material without changing the quality of the base material provided with the repairing material due to overheating.

The present invention may also be developed to a repair apparatus.

A repair apparatus of the present invention is an apparatus of repairing a repair target portion existing in a repair target, and the repair apparatus includes an irradiator for radiating electromagnetic waves so as to heat the repairing material disposed to the repair target portion.

In the repair apparatus of the present invention, it is preferable that the irradiator preferably includes the oscillator for oscillating the electromagnetic waves, and the first shield member that covers the repairing material and the oscillator so as to block the electromagnetic waves.

In the repair apparatus of the present invention, it is preferable that the irradiator further includes a second shield member disposed between the repairing material and the repair target for blocking the electromagnetic waves.

According to the present invention, it is possible to sufficiently heat the repairing material while preventing change in quality of the base material, thereby securely bonding the repairing material to the repair target portion of the base material.

DETAILED DESCRIPTION OF THE PREFERRED EMBODIMENTS

[First Embodiment]

Hereinafter, the present invention will be described in detail based on embodiments shown in accompanying drawings.

First, a configuration of an outer panel of an aircraft obtained by repairing will be described.

Figure 1:
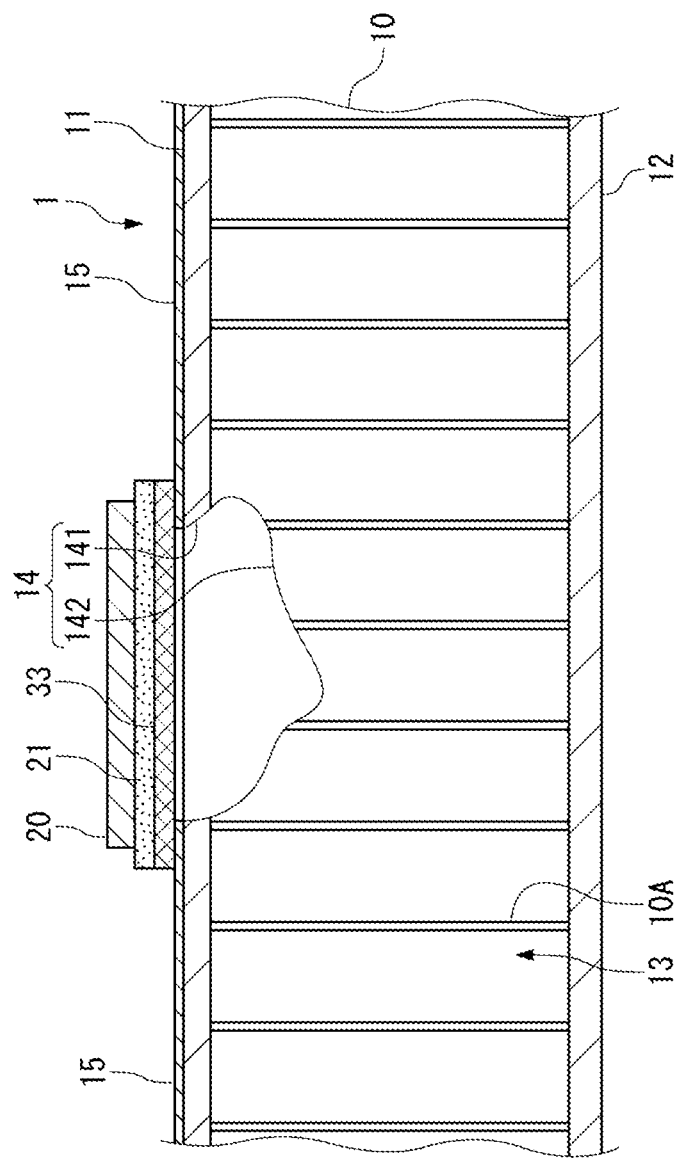
FIG. 1 is a cross sectional view schematically showing a honeycomb core sandwich panel according to the first embodiment.

The outer panel 1 shown in FIG. 1 forms an outer surface of a wing of the aircraft. The outer panel 1 is respectively disposed on upper and lower sides of the wing with a distance therebetween, and the outer panel 1 along with spars that form a front edge and a rear edge of the wing are assembled in a box shape.

This outer panel 1 has such a structure that holds a core (core member) 10 having a honeycomb structure between two outer skins 11, 12 (honeycomb core sandwich panel). The outer panel 1 may include other layers than the core 10 and the outer skins 11, 12.

The outer panel 1 may constitute the outer surface of a fuselage of the aircraft.

The core 10 includes bulkheads 10A that form a number of cells 13 each having a hexagon cross section. The core 10 is made of a composite material, a metallic material, or a resin material, etc.

The core 10 has a hollow space inside each cell 13, and includes air thereinside. Moisture is contained in the air. The moisture is also held in each bulkhead 10A. Water droplets may be produced on the surfaces of the bulkheads 10A by dew condensation. Hence, the moisture is accumulated inside the core 10 (inside the cells 13 and the bulkheads 10A).

The outer skins 11, 12 are made of a composite material, a metallic material, or a resin material, and are fixed to the end surfaces of the core 10. The outer skins 11, 12 cover apertures surrounded by the bulkheads 10A so as to seal the cells 13.

Each outer surface of the outer skins 11, 12 is provided with a lightning protection material 15 formed in a mesh sheet made of a conductive material, such as metal. A material that is more excellent in conductivity than carbon fibers included in the composite material forming the outer skins 11, 12 is used for the lightning protection material 15.

The outer panel 1 may be damaged by receiving impact of a lightning strike or a hailstorm. Such damage may generate a repair target portion 14 required to be repaired in the outer panel 1.

The repair target portion 14 is generated when a flying object, such as a hailstone, penetrates the lightning protection material 15 and the outer skin 11, and reaches the inside of the core 10. A damaged hole 141 is formed through the outer skin 11 in the thickness direction of the outer skin 11. A damaged recess portion 142 continued to the damaged hole 141 is formed in the core 10.

The repair target portion 14 denotes a damaged portion that is an inner surface of the damaged hole 141 and the damaged recess portion 142, and a predetermined area including the surroundings of the damaged portion.

If the damaged hole 141 is formed, rain water and rinse water may infiltrate into the core 10 through the damaged hole 141, which facilitate moisture accumulation inside the core 10.

In the present embodiment, the damaged hole 141 is covered with a plate-like repairing patch 20 formed of a carbon fiber reinforcement resin, and the repairing patch 20 is bonded to the surroundings of the damaged hole 141.

The outer skin 11 around the damaged hole 141 preferably has a surface prepared to be suitable for being bonded to the repairing patch 20 through sanding and rinse.

In the present embodiment, the damaged recess portion 142 is left as a cavity with filling nothing therein, but the damaged recess portion 142 may be filled with a material for repairing.

The repairing patch 20 is produced by laminating carbon fibers formed in a sheet form, impregnating thermosetting resin, such as epoxy, polyimide, polyurethane, and unsaturated polyester, in the laminated material, and heating this thermosetting resin to be hardened. The repairing patch 20 may be a precured patch that is cured in advance of the repairing. The repairing patch 20 is formed in a circular shape, but may also be formed in an oval shape, or a rectangular shape, etc.

A conductive lightning protection material formed in a sheet form may be laminated onto the repairing patch 20.

Glass fibers may be used in the repairing patch 20, instead of carbon fibers, and any kind of fibers may be used. The repairing patch 20 may also be made of metal.

A shield member 33 formed in a mesh sheet made of a conductive material, such as metal and carbon, is disposed between the repairing patch 20 and the outer skin 11. The shield member 33 is bonded through an adhesive layer (not shown) to the lightning protection material 15 or the outer skin 11 in the vicinity of the damaged hole 141. The shield member 33 has the same shape as that of the repairing patch 20.

The shield member 33 blocks microwaves MW transmitted from a microwave irradiator 30 described later. Each mesh aperture of the shield member 33 is configured to be further smaller than the wavelength of the microwaves MW.

Along with the lightning protection material 15 in the vicinity of the damaged hole 141, the shield member 33 is included in the lightning protection device. The shield member 33 is formed in a mesh form so as to reduce the weight of the aircraft, and to be flexible in accordance with the shape of the outer skin 11, but may be formed in a plate-like shape with no mesh apertures.

The repairing patch 20 is bonded to the shield member 33 through an adhesive layer 21 formed by hardening an epoxy adhesive containing an epoxy resin that is a thermosetting resin. Along with the repairing patch 20, the adhesive layer 21 is included in the repairing material.

The microwave irradiator 30 used for repairing the outer panel 1 will be described with reference to FIG. 2B.

The microwave irradiator 30 includes a shield case 31 for blocking the microwaves MW, and an oscillator 32 of the microwaves MW disposed inside the shield case 31.

The shield case 31 is formed of a conductive material, such as metal and carbon, and covers the repairing patch 20. An opening 31A having a shape in accordance with the repairing patch 20 is formed in the shield case 31. The oscillator 32 is disposed on an inner surface 31B of the shield case 31 opposing the opening 31A. The shield case 31 is placed on the outer panel 1 with the opening 31A facing the repairing patch 20.

The shield case 31 and the shield member 33 block the microwaves MW transmitted from the oscillator 32, thereby restricting an irradiation region of the microwaves MW. The opening 31A of the shield case 31 is occluded by the shield member 33.

The oscillator 32 oscillates microwaves MW at a wavelength of 2.45 GHz, and radiates the microwaves MW to the repairing patch 20 disposed to the repair target portion 14.

Amount of radiation of the microwaves MW from the oscillator 32 can be adjusted by a controller (not shown).

The oscillator 32 may be disposed at an appropriate position inside the shield case 31. There may be provided a plurality of the oscillators 32.

A repair method of the outer panel 1 will be described with reference to FIG. 2A and FIG. 2B, hereinafter.

Figure 2A:
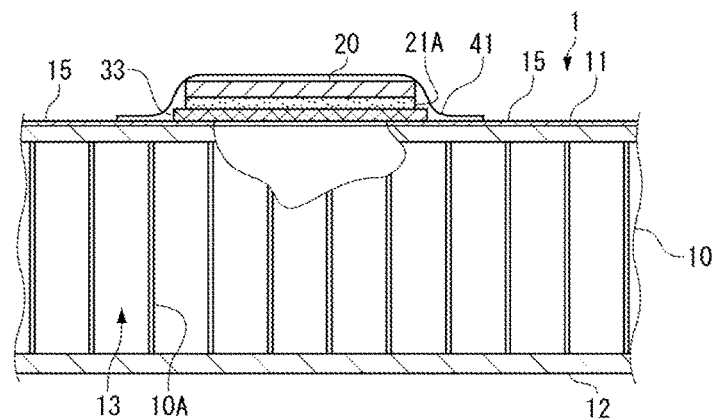
FIG. 2A is a drawing explaining a repair method of the honeycomb core sandwich panel.

As shown in FIG. 2A, the repairing patch 20 is disposed to the repair target portion 14 (repairing material disposing step). At this time, the shield member 33 is disposed between the repairing patch 20 and the outer skin 11. Specifically, the shield member 33 is bonded around the damaged hole 141. In this case, it is preferable to use a conductive adhesive.

A thermosetting adhesive 21A formed in a film form, and the repairing patch 20 are disposed on the shield member 33.

Subsequently, the repairing patch 20 and its surroundings are covered with a bag film 41 having thermal resistance, and a clearance between the bag film 41 and the outer skin 11 is sealed. Vacuum evacuation is performed by a valve (not shown) disposed to the bag film 41 (vacuum evacuating step). It is preferable to continue the vacuum evacuation even in the subsequent thermosetting step.

Because of a difference in pressure of the atmosphere between the inside and the outside of the bag film 41 that is depressurized by the vacuum evacuation, the repairing patch 20 is pressed against the surface of the outer skin 11, thereby allowing the repairing patch 20 to be in tight contact with the outer skin 11 through the adhesive 21A.

Figure 2B:
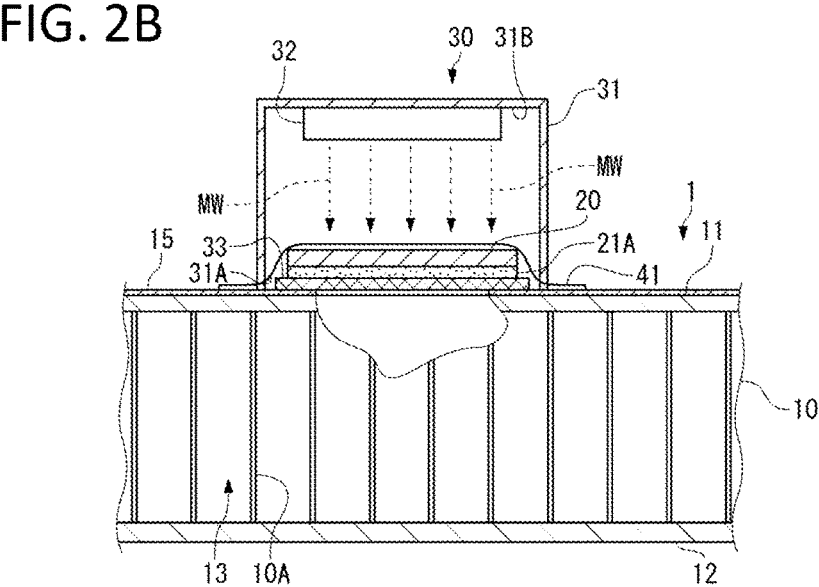
FIG. 2B is a drawing explaining the repair method of the honeycomb core sandwich panel.

Subsequently, as shown in FIG. 2B, the microwave irradiator 30 is disposed to the outer panel 1, and the microwave irradiator 30 is then operated. The repairing patch 20 and the adhesive 21A are caused to generate heat by irradiating the repairing patch 20 with the microwaves MW, thereby heating and hardening the thermosetting resin of the adhesive 21A (heating-hardening step).

The shield case 31 of the microwave irradiator 30 and the shield member 33 cover the oscillator 32 and the repairing patch 20, respectively. The shield case 31 and the shield member 33 form a closed space.

Part of the microwaves MW transmitted from the oscillator 32 are absorbed by the repairing patch 20, and thereafter, the transmitted microwaves MW also irradiate the adhesive 21A. Then, the adhesive 21A and the repairing patch 20 generate heat based on the dielectric loss due to polarization.

Since the frequency of the microwaves MW approximates the natural frequency of the macromolecules of an epoxy resin, molecules cause drastic friction among them due to the polarization, which significantly generates heat. By irradiating with the microwaves MW, because of heat generated by each molecule of the epoxy resin contained in the adhesive 21A, the entire adhesive 21A is rapidly heated up to a temperature required for hardening the adhesive 21A.

The repairing patch 20 significantly generates heat if the repairing patch 20 is formed of an epoxy resin, and even if the repairing patch 20 is formed of resin other than epoxy, this repairing patch 20 also generates heat. In either case, the heat generated by the repairing patch 20 is transmitted to the adhesive 21A, which facilitates heating of the adhesive 21A.

The microwaves MW passing through the adhesive 21A are reflected on the shield member 33, and re-enter the adhesive 21A and the repairing patch 20. The reflected microwaves MW also cause the adhesive 21A and the repairing patch 20 to generate heat.

Because the microwaves MW are reflected on the shield member 33 and on the inner wall of the shield case 31, the irradiation region of the microwaves MW is restricted within an area surrounded by the shield case 31 and the shield member 33. Hence, it is possible to locally heat only the repairing patch 20 and the adhesive 21A located within the irradiation region of the microwaves MW in the outer panel 1 without dispersing the energy of the microwaves MW to the outside of the shield case 31 and the shield member 33.

If the microwaves MW are radiated for a predetermined time period, the entire adhesive 21A is sufficiently heated and hardened. After the hardening is completed, the adhesive 21A firmly adheres to the repairing patch 20 and the shield member 33 so as to form the adhesive layer 21. The repairing patch 20 is integrally bonded to the outer skin 11 via the adhesive layer 21 and the shield member 33.

The repairing of the outer panel 1 is completed in this way.

According to the repair method of the present embodiment, the radiation of the microwaves MW causes the repairing patch 20 and the adhesive 21A to generate heat without using an external heat source, thereby applying heat to the adhesive 21A required to be heated.

The heat source of the present embodiment is the repairing patch 20 and the adhesive 21A that constitute the repairing material, and they are the heating target themselves. Hence, different from the case of using the external heat source, it is not required to generate thermal energy with greater quantity of heat than quantity of heat reaching the heating target, estimating diffusion of the thermal energy during transmission of the heat.

Specifically, in the present embodiment, sufficient quantity of heat for hardening the adhesive 21A is used so as to cause the repairing patch 20 and the adhesive 21A to generate heat, thereby sufficiently heating the adhesive 21A as well as minimizing thermal diffusion to the surroundings of the repairing patch 20 and the adhesive 21A.

According to the present embodiment, it is possible to securely bond the repairing patch 20 to the outer skin 11 while preventing change in quality of the outer skin 11 that is the base material provided with the repairing patch 20 due to overheating.

In addition, by restricting the irradiation region of the microwaves MW using the shield case 31 and the shield member 33, it is possible to locally heat only the repairing patch 20 and the adhesive 21A in an efficient manner. Hence, it is possible to securely prevent change in quality of the base material and bonding failure of the adhesive 21A, thereby more sufficiently securing reliability of the outer panel 1 after the repairing.

The shield member 33 used for repairing of the outer panel 1 is left in the outer panel 1 even after the repairing. The shield member 33 along with the lightning protection material 15 contribute to diffusion of a lightning strike current to the outer panel 1. The lightning strike current is diffused along the shield member 33 and the lightning protection material 15. Hence, it is possible to prevent thermal deformation of the outer skins 11, 12, and sparks between the members constituting the outer panel 1.

Through bonding the shield member 33 to the lightning protection material 15 with the conductive adhesive, the lightning strike current can be smoothly diffused to the shield member 33 and the lightning protection material 15 through the conductive adhesive.

If the core 10 is heated at the time of heating and hardening the adhesive 21A, the temperature inside the core 10 becomes increased, and moisture accumulated inside the core 10 becomes vaporized. The aperture of each cell 13 is occluded by the outer skins 11, 12, so that the pressure inside the cells 13 becomes so increased due to the vaporization that a force of peeling off the outer skins 11, 12 from the core 10 is applied to the outer panel 1. A pin hole is formed in the repairing patch 20 so as to release water vapor inside the core 10 in some cases, but if the inner pressure of the cells 13 becomes increased, the outer skins 11, 12 may be peeled off from the core 10.

According to the present embodiment, however, it is sufficient for the repairing patch 20 and the adhesive 21A to generate amount of heat to be absorbed by themselves, and thus it is possible to restrict the area to be heated within the repairing patch 20 and the adhesive 21A. Accordingly, it is possible to suppress increase in temperature inside the core 10, thereby preventing destruction of the outer panel 1 caused by increase of the inner pressure of the cells 13.

Accordingly, a process of drying the core 10 in advance so as to prevent destruction of the outer panel 1 can be eliminated. It takes a very long time to sufficiently dry the core 10 where moisture is contained in the air existing in a number of the cells 13 and in the bulkheads 10A; therefore, the repair method of the present embodiment that eliminates the drying process can significantly reduce time required for the repairing.

Accordingly, the repair method of the present embodiment is suitable for repairing of the outer panel 1 of an aircraft where a scheduled flight service is strongly desired.

In the above embodiment, for the purpose of causing the epoxy resin to significantly generate heat to be hardened, the oscillation frequency of the microwaves MW is set to be approximately 2.45 GHz corresponding to the natural frequency of macromolecules of an epoxy resin. In other words, there is an optimum oscillation frequency for generating heat depending on the type of resin.

As described above regarding the repairing patch 20, resin other than epoxy can also be caused to generate heat using the microwaves MW of approximately 2.45 GHz. Any oscillation frequency and any type of resin may be selected as far as the repairing patch 20 and the adhesive 21A can be heated by self-heating so as to harden the adhesive 21A to be bonded to the repair target portion 14.

At the time of selecting the type of resin and the oscillation frequency, it is preferable to consider matching between the natural frequency of the resin and the oscillation frequency, and availability depending on the oscillation frequency of the oscillator.

Microwaves generally denote electromagnetic waves having a frequency band from 300 MHz to 3 THz, but the oscillation frequency may also be selected from frequency bands deviating from the category of microwaves.

Depending on the oscillation frequency of the electromagnetic waves, it is preferable to select material quality and configurations of the shield case 31 and the shield member 33 that block the electromagnetic waves.

In the present invention, the shield case 31 and the shield member 33 are not essential, but needless to mention that it is preferable to provide them for the sake of causing the repairing material to efficiently generate heat while preventing dispersion of energy.

In the case of omitting the shield member 33, the electromagnetic waves also irradiate the outer skin 11. At this time, in order to avoid change in quality of the outer skin 11 due to heating, it is preferable to use such a material that has a natural frequency different from the oscillation frequency of the electromagnetic wave.

Prepreg may be used for the repairing material disposed to the repair target portion 14. The prepreg and adhesive that bonds the prepreg to the repair target portion 14 are included in the repairing material. In this case, the adhesive and the prepreg are disposed to the repair target portion 14 so that each thermosetting resin contained in the adhesive and the prepreg is heated and hardened by irradiation with the electromagnetic waves.

Alternatively, fibers and a liquid thermosetting resin may also be used as the repairing material. In this case, the thermosetting resin impregnated in the fibers is heated and hardened by irradiating the thermosetting resin with the electromagnetic waves.

Regardless of the form of the repairing material, the repairing material can be self-heated by irradiating the repairing material with the electromagnetic waves; therefore, it is possible to sufficiently heat the thermosetting resin before being hardened while preventing change in quality of the base material, thereby reliably bonding the repairing material to the repair target portion 14.

The outer panel 1 of the present embodiment is not limited to a honeycomb core sandwich panel, and may be configured in any other form. For example, the outer panel formed of fiber-reinforced resin across its entire thickness, or even a metallic outer panel may also be the repair target.

A thermoplastics resin, such as nylon, polyethylene, polystyrene, and polyvinyl, may also be used in the repairing material disposed to the repair target portion 14.

For example, in the case of using prepreg produced by half-hardening fibers impregnated with a thermoplastic resin as the repairing material, a repairing material disposing step of disposing the repairing material to the repair target portion 14, and a step of irradiating the repairing material with the electromagnetic waves so as to heat and melt the repairing material, and thereafter putting the repairing material into a solidified state are performed. In this case, it is possible to attain the same operational effect as that in the case of using the thermosetting resin.

[Second Embodiment]

Figure 3:
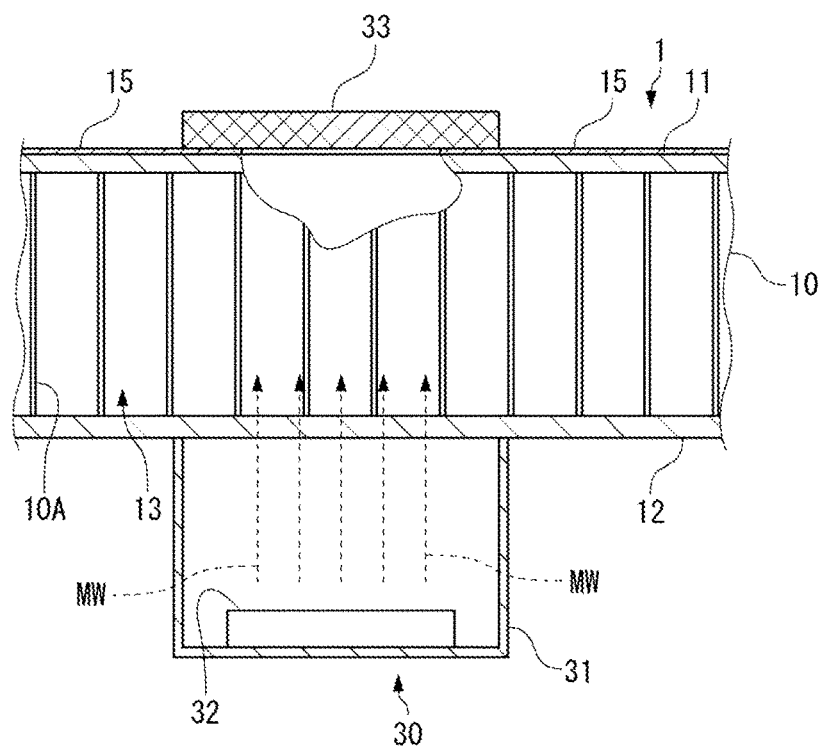
FIG. 3 is a drawing explaining a repair method of a honeycomb core sandwich panel according to the second embodiment.

Hereinafter, the repair method of repairing a honeycomb core sandwich panel as the repair target will be described with reference to FIG. 3. Substantially the same configurations as the configurations already described above are denoted with the same reference numerals.

In the repair method of the second embodiment, a moisture releasing step is performed, which releases moisture accumulated inside the core 10 of the outer panel 1 of a honeycomb core sandwich panel to the outside by irradiating it with the microwaves MW.

For this purpose, the microwave irradiator 30 is disposed to the outer skin 12 of the outer panel 1, and the shield member 33 is disposed to the outer skin 11 opposite to the outer skin 12 at a position facing the microwave irradiator 30.

In the moisture releasing step, the microwave irradiator 30 is operated to radiate the microwaves MW from the oscillator 32 to the outer panel 1. Then, the microwaves MW are also radiated to the inside of the core 10 through the outer skin 12. The microwaves MW are mainly radiated to an area between the shield case 31 and the shield member 33 within the core 10. The microwaves MW act on the water molecules accumulated inside the core 10, thereby rapidly heating the water to be vaporized. The water vapor generated by the vaporization is released to the outside of the core 10 through the apertures of the cells 13 exposed in the repair target portion 14 and the meshes of the shield member 33.

Thereafter, the microwave irradiator 30 and the shield member 33 are removed from the outer panel 1, and the repairing material is disposed to the repair target portion 14. The repairing patch 20, prepreg, or a liquid thermosetting resin may be used as the repairing material.

Subsequently, a heating-hardening step of heating and hardening the repairing material is performed. Since the moisture is released from the inside of the core 10 in the above described moisture releasing step, even if the temperature in the core 10 is increased by heating the repairing material, it is possible to suppress increase of the inner pressure in the cells 13 due to the water vapor. Accordingly, it is possible to prevent the outer panel 1 from being destroyed.

Any method may be used for heating and hardening the repairing material. The microwaves MW may be radiated from the microwave irradiator 30, or any other method may be used, instead.

According to the repair method of the present embodiment, through the moisture releasing step using the microwaves MW, the moisture inside the core 10 can be rapidly heated, thereby encouraging vaporization of the moisture. Hence, it is possible to quickly reduce the amount of the moisture inside the core 10 to such an extent that prevents destruction of the outer panel 1 due to increase of the inner pressure of the cells 13 at the time of the subsequent heating process. Accordingly, it is possible to prevent destruction of the outer panel 1 without requiring a long time for reducing the amount of the moisture inside the core 10.

The moisture releasing step using the microwaves MW may be carried out without presupposing the repairing.

It may be configured to dispose the microwave irradiator 30 to the outer skin 11, and the shield member 33 to the outer skin 12 as far as the shield case 31 does not hinder the moisture release from the inside of the core 10.

The repair method of the present invention is applicable to repairing of not only the outer panel of an aircraft, but also wall materials, floor materials, ceiling materials, and doors included in an aircraft.

The present invention may be applicable to repairing of other structural components and accessories of an aircraft.

In addition, the present invention may be applicable to any repair target other than components included in an aircraft, such as blades of a windmill, and also applicable to repairing of various objects damaged by impact, high temperature, abrasion, and corrosion, etc.

The repair target in the present invention is not limited to a plate-like object. The present invention may be widely applicable to repairing of bonding the repairing material to the repair target portion existing in an object in any form.

Other than the above description, the configurations of the aforementioned embodiments may be appropriately selected, or changed to other configurations without departing from the spirit and scope of the present invention.

What is claimed is:

1. A method of repairing a repair target portion existing in a repair target,
   the method comprising:
   a repairing material disposing step of disposing a repairing material to the repair target portion; and
   a heating-hardening step of heating and hardening the repairing material by irradiating the repairing material with electromagnetic waves, wherein
      in the repairing material disposing step, a second shield member for blocking the electromagnetic waves is disposed between the repairing material and the repair target, and wherein
      the heating-hardening step further comprises irradiating a portion of the second shield member with the electromagnetic waves without heating the second shield member to a temperature reached by the repairing material in response to being irradiated with the electromagnetic waves.

2. The method of repairing a repair target portion according to claim 1, wherein
   in the heating-hardening step,
   the repairing material and an oscillator that oscillates the electromagnetic waves are covered by a first shield member for blocking the electromagnetic waves.

3. The method of repairing a repair target portion according to claim 1, wherein
   a honeycomb core sandwich panel configured by holding a core having a honeycomb structure including a number of cells between outer skins is repaired as the repair target.

4. The method of repairing a repair target portion according to claim 1, wherein the heating-hardening step is performed using an irradiator for radiating electromagnetic waves so as to heat the repairing material disposed to the repair target portion.

5. The method of repairing a repair target portion according to claim 4, wherein
   the irradiator comprises:
   an oscillator for oscillating the electromagnetic waves; and
   a first shield member for covering the repairing material and the oscillator so as to block the electromagnetic waves.

6. The method of repairing a repair target portion according to claim 4, wherein
   the irradiator further comprises the second shield member disposed between the repairing material and the repair target so as to block the electromagnetic waves.

7. The method of repairing a repair target portion according to claim 5, wherein
   the irradiator further comprises the second shield member disposed between the repairing material and the repair target so as to block the electromagnetic waves.

8. The method of repairing a repair target portion according to claim 1, the repair target portion existing in a honeycomb core sandwich panel configured by holding a core having a honeycomb structure including a number of cells between outer skins, the honeycomb core sandwich panel being the repair target,
   the method comprising:
   disposing an oscillator of electromagnetic waves on a side of one of the outer skins of the honeycomb core sandwich panel;
   disposing a shield member for blocking the electromagnetic waves on a side of the other of the outer skins of the honeycomb core sandwich panel;
   performing a moisture releasing step of vaporizing moisture existing inside the core using the electromagnetic waves radiated from the oscillator, and releasing the moisture from the repair target portion to an outside of the core; and thereafter,
   performing a heating-hardening step of hardening a repairing material disposed to the repair target portion by heating.

9. A method of repairing a repair target portion existing in a repairing target,
   the method comprising:
   a repairing material disposing step of disposing a repairing material to the repair target portion; and
   a step of heating and melting the repairing material by irradiating the repairing material with electromagnetic waves, and thereafter putting the repairing material into a solidified state, wherein
      in the repairing material disposing step, a second shield member for blocking the electromagnetic waves is disposed between the repairing material and the repair target, and
      in the step of heating, the electromagnetic waves irradiating the repairing material induce heat within the repairing material causing the repairing material to reach a melting temperature without significantly inducing heat in the second shield member.

10. The method of repairing a repair target portion according to claim 9, wherein
    the step of heating and melting is performed using an irradiator for radiating electromagnetic waves so as to heat the repairing material disposed to the repair target portion.

11. The method of repairing a repair target portion according to claim 10, wherein
    the irradiator comprises:
    an oscillator for oscillating the electromagnetic waves; and
    a first shield member for covering the repairing material and the oscillator so as to block the electromagnetic waves.

12. The method of repairing a repair target portion according to claim 10, wherein
    the irradiator further comprises the second shield member disposed between the repairing material and the repair target so as to block the electromagnetic waves.

13. The method of repairing a repair target portion according to claim 11, wherein
the irradiator further comprises the second shield member disposed between the repairing material and the repair target so as to block the electromagnetic waves.

14. The method of repairing a repair target portion according to claim 8, wherein
in the heating-hardening step,
the repairing material and an oscillator that oscillates the electromagnetic waves are covered by a first shield member for blocking the electromagnetic waves.

15. The method of repairing a repair target portion according to claim 8, wherein the heating-hardening step is performed using an irradiator for radiating electromagnetic waves so as to heat the repairing material disposed to the repair target portion.

16. The method of repairing a repair target portion according to claim 11, wherein
the irradiator comprises:
an oscillator for oscillating the electromagnetic waves; and
a first shield member for covering the repairing material and the oscillator so as to block the electromagnetic waves.

17. The method of repairing a repair target portion according to claim 11, wherein
the irradiator further comprises the second shield member disposed between the repairing material and the repair target so as to block the electromagnetic waves.

\* \* \* \* \*